United States Patent [19]

Lesche

[11] 4,095,203
[45] June 13, 1978

[54] ARRANGEMENT FOR OBTAINING AN ELECTRICAL SIGNAL PROPORTIONAL TO A DISTANCE

[75] Inventor: Wolfgang Lesche, Berlin, Germany

[73] Assignee: Siemens Aktiengesellschaft, Munich, Germany

[21] Appl. No.: 793,502

[22] Filed: May 4, 1977

[51] Int. Cl.² .............................................. H01F 21/04
[52] U.S. Cl. ........................................ 336/20; 336/115
[58] Field of Search ..................... 343/868; 336/15, 20, 336/115, 116, 117, 118

[56] References Cited

U.S. PATENT DOCUMENTS 3,417,403  12/1968  Fenwick ............................ 336/15 X Primary Examiner—Thomas J. Kozma
Attorney, Agent, or Firm—Kenyon & Kenyon, Reilly, Carr & Chapin

[57] ABSTRACT

An arrangement for obtaining an electrical signal corresponding to a distance comprising a conductor loop which is adapted to be arranged in a magnetic a-c field with its plane transverse to the field and which is formed into first and second conductor sections. The conductor sections extend from the respective ends of the loop to a stationary member and the arrangement is further provided with a movable adjusting means whose movement corresponds to the aforesaid distance. The adjusting means is arranged so that a first portion of the first conductor section extends from its respective loop end to the adjusting means and a second portion thereof extends from the adjusting means to the stationary member. The adjusting means is further provided with a deflecting means for offsetting the second conductor portion from the first conductor portion.

10 Claims, 5 Drawing Figures

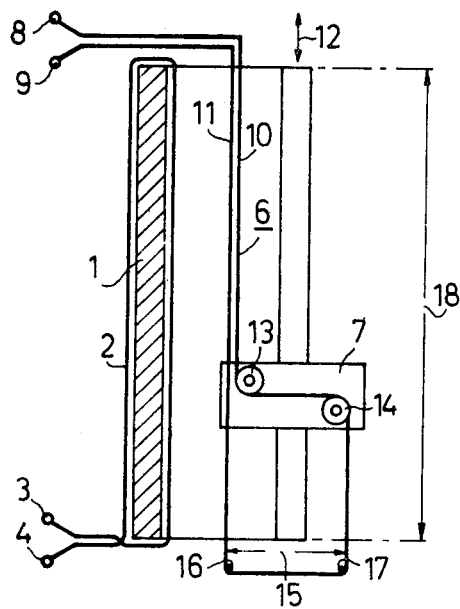
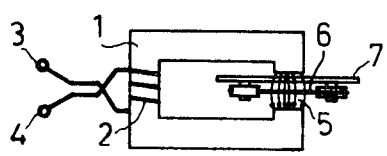
Fig. 1
Fig. 1a
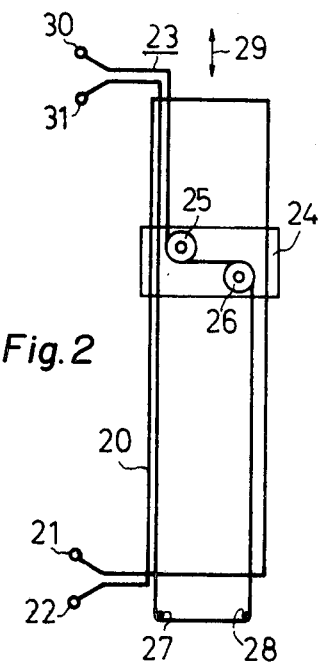
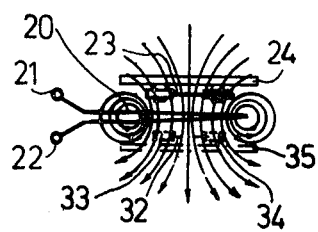
Fig. 2
Fig. 2a

ARRANGEMENT FOR OBTAINING AN ELECTRICAL SIGNAL PROPORTIONAL TO A DISTANCE

BACKGROUND OF THE INVENTION

1. Field of the Invention

The invention relates to an arrangement for deriving an electrical signal corresponding to a distance and, in particular, to an arrangement wherein a conductor loop is adapted to be arranged in a magnetic a-c field with its plane transverse to the field and a movable adjusting means is provided whose movement corresponds to the respective distance and results in adjustment of the loop.

2. Description of the Prior Art

In a typical prior art arrangement of the above type, the conductor loop is arranged in a air gap of an iron core which is excited by a winding connected to an a-c voltage source and a d-c voltage source. The dimensions of the conductor loop correspond approximately to the cross section of the iron core in the vicinity of the air gap and the loop is initially placed completely in the gap. When the conductor loop is moved so a portion of its area lies outside the gap, the magnetic flux in the iron core now passes through only the portion of the area of the loop remaining in the gap. The induced voltage at the ends of the loop, thus, becomes smaller than when the loop is totally within the gap. Through an appropriately designed electrical circuit coupled to the loop ends and, in particular, by using phase-sensitive rectification, the voltage across the loop ends can be made directly proportional to the displacement of the loop and, therefore, to a distance.

The above-described prior art arrangement is disadvantageous in that the conductor loop portion located outside the air gap of the core is not completely free of magnetic interlinkage, since it is still permeated by stray flux. The presence of this stray flux must be accounted for through the use of elaborate correction circuits when converting into a corresponding electrical signal, otherwise erroneous results will occur. If the correction circuitry is not used, then the measuring range of loop, i.e., the maximum measurable distance change, is relatively small, if a given accuracy is required. It is a further disadvantage of this prior art arrangement that the ends of the conductor loop are moved as the loop is displaced. This necessitates the use of either movable contacts or flexible wires to couple to the ends of the loop, which can have an adverse effect on the life of the arrangement.

It is an object of the present invention to provide an arrangement for obtaining an electrical signal corresponding to a distance which permits an electrical signal to be derived therefrom without the use of moving contact elements. In addition, it is a further object of the invention to provide an arrangement which permits obtaining electrical signals corresponding to large distance changes without the use of complex correction circuits.

SUMMARY OF THE INVENTION

In accordance with the principles of the present invention, the above and other objectives are accomplished in an arrangement comprising a conductor loop which is adapted to be arranged in a magnetic a-c field with its plane transverse to the field and which is formed from first and second conductor sections. The first and second conductor sections extend from the respective loop ends to a stationary member and the arrangement further includes a particularly configured and arranged movable adjusting means whose movement corresponds to a distance. More specifically, the adjusting means is situated so that a first portion of the first conductor section extends from its respective loop end to the adjusting means and a second portion of the first conductor section extends from the adjusting means to the stationary member. The adjusting means is further provided with a deflecting means for offsetting the second conductor portion with respect to the first conductor portion.

With the arrangement of the invention so constructed, movement of the adjusting means through varying distances causes the length of the second or offset conductor portion and, thereby, the effective area of the loop, to vary. As a result, the voltage appearing at the ends of the loop will vary proportionally to the distance moved by the adjusting means. Furthermore, due to the adjusting means acting only to change the second conductor portion, movement of the adjusting means does not cause movement of the ends of the conductor loop, which now can remain stationary. Thus, neither flexible leads nor moving contacts are necessary to connect the arrangement of the invention to succeeding evaluation devices. The arrangement, therefore, has high operational reliability.

The accuracy of the arrangement of the invention is particularly high for the reason that, while the effective area of the conductor loop changes, the area is always entirely within the magnetic field and is not moved out therefrom, as is necessary in the above-described prior art arrangement. The conductor loop is, therefore, always located in the regions of the magnetic field in which the magnetic field lines are concentrated, and its accuracy is thus not affected adversely by stray fluxes.

The arrangement of the invention has the further advantage that electrical signals can be derived for relatively large changes of distance. This is due to the fact that, since the arrangement operates by changing the effective area of the conductor loop in the magnetic field, a proportionality correspondence between the distance moved by the adjusting means and the electrical signal from the loop, even for relatively large changes in distances, is also maintained.

Depending upon the shape of the other conductor section of the loop, different characteristics of electrical signal versus the distance can be obtained for the loop. A characteristic wherein the electrical signal is directly proportional to the distance is preferable. This can be realized with the arrangement of the invention in an advantageous manner by forming the second section of the conductor loop so that the path of this second section is parallel to that of the first conductor section and extends from its respective loop end to a second stationary member which is spaced from the first stationary member in a distance transverse to the direction of motion of the adjusting means by an amount equal to the offset of the first and second conductor portions. In this form of the arrangement of the invention, the effective conductor loop forms a rectangle, the length of which is changed in accordance with the distance moved by the adjusting means, so that the magnitude of the electrical signal is directly proportional to the distance.

The two sections of the conductor loop of the arrangement of the invention may be comprised of various materials. Advantageously, the two sections of the conductor loop may be comprised of a flexible material which may, for example, be in the form of a ribbon or a wire.

In some applications, it may also be advantageous to form only the one section of the conductor loop from a flexible material, while the other section is formed from a stretched, rigid conductor element. Through appropriate design of the aforesaid conductor element, which may be formed, for example, by a conductor run on a printed circuit board, field distortion at the ends of the travel of the adjusting means can be compensated for.

In a further aspect of the invention, the arrangement of the invention can be modified by arranging a further conductor loop in the magnetic field, in order to derive a further electrical signal corresponding to a further distance. This is of particular advantage if an air coil located in a plane parallel to the conductor loop serves to generate the magnetic a-c field. Then, one conductor loop can be arranged on each side of the air coil and both loops will still always lie entirely in a largely homogeneous magnetic field.

A further advantageous configuration of the arrangement of the invention comes about through the use of the electrically conductive guide elements of the adjusting means to form an air coil for generating the magnetic a-c field. Because the guide elements of the adjusting means are an unchangeable part of the arrangement, a separate component in the form of a separately fabricated air coil can be disposed with if the former are utilized for forming the air coil.

In view of obtaining the smallest possible physical configuration and to avoid high manufacturing costs, it has been found particularly advantageous to use, for generating the magnetic a-c field, at least a single rectangular turn which is connected to the a-c voltage. The rectangular turn then lies in a plane parallel to the conductor loop and ensures that the conductor loop is permeated substantially perpendicularly by a magnetic flux.

BRIEF DESCRIPTION OF THE DRAWINGS

The above and other features and aspects of the present invention will become more apparent upon reading the following detailed description in conjunction with the accompanying drawings, in which:

FIG. 1 shows an arrangement for deriving an electrical signal in accordance with the principles of the present invention;

FIG. 1a is an elevational view of the device of FIG. 1;

FIG. 2 shows a modified form of the arrangement of FIG. 1;

FIG. 2a is an elevational view of the device of FIG. 2; and

DETAILED DESCRIPTION

Figure 3:
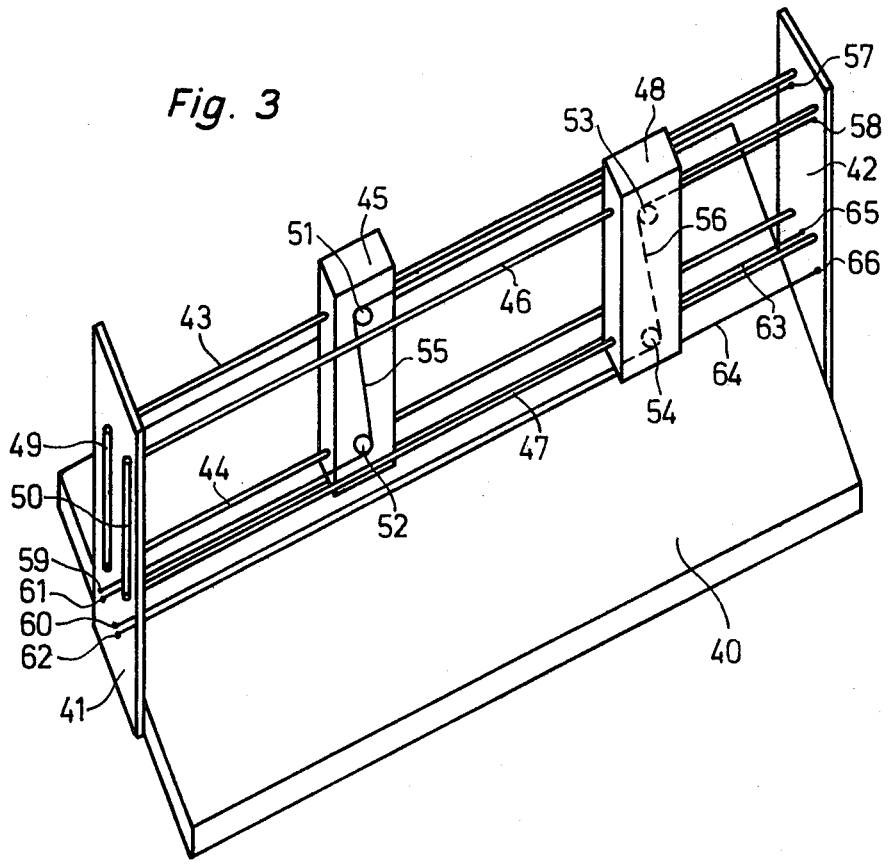
FIG. 3 illustrates a particularly advantageous structural configuration of an arrangement in accordance with the principles of the invention.

FIG. 1 illustrates an arrangement in accordance with the principles of the present invention. As shown, the arrangement includes a core 1 of magnetic material upon which a winding 2 is placed. The ends 3 and 4 of the winding 2 are connected to an a-c voltage source which is not shown.

The core 1 has an air gap 5 in which are disposed a conductor loop 6 and an adjusting means 7. As can be seen more clearly from the upper illustration of FIG. 1, the conductor loop 6 comprises two conductor sections 10 and 11 which extend from the respective ends 8 and 9 of the loop past the adjusting means 7 and a stationary member 16, respectively, to a stationary member 17. Near the ends 8 and 9 of the loop, the sections 10 and 11 are closely spaced from one another in the magnetic a-c field and extend parallel to the direction of motion of the adjustment means, shown by the double arrow 12.

The adjusting means 7 is arranged in the path of the conductor section 10 and includes a deflecting means, in the form of rollers 13 and 14, which deflects the portion of section 10 between the adjusting means and the stationary point 17 such that it is offset from the portion of section 10 between the adjusting means and the loop end 8. The former portion of the section 10 is thus spaced at a distance 15 from the section 11, which distance is greater than that between the latter portion of section 10 and section 11.

As can be seen, the maximum measurable change of the distance through which the adjusting means 7 can move is given by the distance 18, which corresponds to the width of the core 1 in the region of the gap 5. As the width of the core 1 can be made relatively large without difficulty, electrical signals for a relatively large range of distance changes can be derived with the arrangement of the invention.

The arrangement of the invention shown in FIG. 2 differs from that of FIG. 1 by the replacement of the core 1 and winding 2 for generating the magnetic a-c field with a rectangular winding comprising a single turn 20 whose ends 21 and 22 are connected to an a-c voltage source which is not shown. The rectangular turn 20 lies in a plane parallel to the conductor loop 23, as is seen more clearly in the lower illustration of FIG. 2. The effective area of the conductor loop 23 is, therefore, permeated by the magnetic field lines approximately perpendicularly.

As can be seen in FIG. 2a, the sections of the conductor loop 23 extend in exactly the same manner as was already explained in detail in connection with the description of FIG. 1. Thus, in this arrangement, the effective area of the conductor loop 23 is changed linearly with the displacement of the adjusting means in the direction of the double arrow 29, due to the deflection of the conductor via the deflecting means formed by rollers 25 and 26. As a result, the voltage at the ends 30 and 31 of the conductor loop 23 is caused to vary accordingly.

By means of a further conductor loop 32, which is indicated by broken lines in FIG. 2a, and the plane of which is parallel to the conductor loop 23, a further electrical signal corresponding to a distance can be derived from the arrangement of FIG. 2. The conductor loop 32 is likewise deflected in the manner of loop 23 by use of a deflecting means comprising rollers 33 and 34 carried by a further adjusting means 35.

FIG. 3 shows an arrangement in accordance with the invention comprising a base plate 40, which carries on two opposite sides mountings 41 and 42. The mountings 41 and 42 hold guide elements 43 and 44, designed as guide rods, for guiding a first adjusting means 45, and, likewise, also hold guide elements 46 and 47, designed as guide rods, for guiding a second adjusting means 48. The pairs of guide elements 43, 44 and 46, 47 respectively, operate to generate the magnetic a-c field, as their ends in the mounting 41 are connected to each other metallically by conducting connections 49 and 50 and their ends in the mounting 42, in turn, are coupled to an oscillator which is not shown.

The adjusting means 45 and 48 each include deflection means in the form of rollers 51, 52 and 53, 54, respectively, over which extend the respective sections 55 and 56 of two conductor loops. The conductor sections 55 and 56, extend, respectively, to stationary points 57 and 58 on the mounting 42. The sections 55 and 56 also extend to terminals 59 and 60 on mounting 41, the latter terminals constituting an end of each of the conductor loops. The further sections 63 and 64 of the two conductor loops extend from the terminals 61 and 62 on the mounting 41 to respective further stationary terminals 65 and 66 on the mounting 42. On the mounting 42, the two respective sections of the conductor loops are joined to each other by metallic connections between the terminals 57 and 65 and between the terminals 58 and 66.

As can be appreciated, by moving the adjusting means 45 and 48 on their respective guide elements, the size of their effective conductor loops are changed in accordance with the position of the respective adjusting means. Thereby, corresponding changes in voltage are generated at the loop ends 59, 61 and 60, 62 of the two conductor loops. This voltage is directly proportional to the displacement of the respective adjusting means.

What is claimed is:

1. An arrangement for deriving an electrical signal corresponding to a distance comprising:
    a conductor loop adapted to be arranged in a magnetic a-c field with its plane transverse to said field, said loop having first and second ends and first and second conductor sections extending from said first and second ends to a first fixed member;
    and a movable adjusting means whose movement is related to said distance, said adjusting means being arranged so that a first conductor portion of said first conductor section extends from its respective end of said loop to said adjusting means and a second conductor portion of said first conductor section extends from said adjusting means to said fixed point, and said adjusting means including means for deflecting said first conductor section so as to offset said second conductor portion from said first conductor portion.

2. An arrangement in accordance with claim 1 wherein:
    said first conductor section is parallel to the direction of movement of said adjusting means.

3. An arrangement in accordance with claim 2 further comprising:
    a second fixed member spaced from said first fixed member in a direction transverse to the direction of movement of said adjusting means by an amount corresponding to said offset of the second conductor portion from said first conductor portion;
    and a portion of said second conductor section extends from its respective loop end to said second fixed member and is parallel to said first section.

4. An arrangement in accordance with claim 1 wherein:
    said first and second conductor sections are each comprised of a flexible material.

5. An arrangement in accordance with claim 1 wherein:
    said first conductor section is comprised of flexible material;
    and said second conductor section is an elongated rigid member.

6. An arrangement in accordance with claim 1 further comprising:
    a further conductor loop adapted to be arranged in said magnetic field.

7. An arrangement in accordance with claim 1 wherein:
    said means for deflecting includes first and second spaced rollers.

8. An arrangement in accordance with claim 7 wherein:
    said rollers are disposed with their centers along a direction transverse to the direction of movement of said adjusting means.

9. An arrangement in accordance with claim 1 further comprising:
    an air coil lying in a plane parallel to the plane of said conductor loop, said air coil serving to generate said magnetic field.

10. An arrangement in accordance with claim 9 wherein:
    said air coil comprises guide elements which are metallically connected to each other and are comprised of electrically conducting material, said guide elements forming means for guiding said adjusting means during movement thereof.

* * * * *